(12) United States Patent
Tian et al.

(10) Patent No.: US 10,695,726 B2
(45) Date of Patent: Jun. 30, 2020

(54) MICRO-BUBBLE GENERATOR

(71) Applicant: Shanghai Jiutian Auto Parts Manufacturing Co., Ltd., Shanghai (CN)

(72) Inventors: Song Tian, Shanghai (CN); Muhua Cai, Shanghai (CN)

(73) Assignee: Shanghai Jiutian Auto Parts Manufacturing Co., Ltd., Shanghai (CN)

(*) Notice: Subject to any disclaimer, the term of this patent is extended or adjusted under 35 U.S.C. 154(b) by 149 days.

(21) Appl. No.: 16/122,485

(22) Filed: Sep. 5, 2018

(65) Prior Publication Data
US 2020/0038815 A1 Feb. 6, 2020

(30) Foreign Application Priority Data
Aug. 2, 2018 (CN) .......................... 2018 1 0870131

(51) Int. Cl.
*B01F 3/04* (2006.01)
*B01F 5/04* (2006.01)
*B01F 5/06* (2006.01)
*B01F 7/00* (2006.01)

(52) U.S. Cl.
CPC ...... *B01F 3/04113* (2013.01); *B01F 3/04531* (2013.01); *B01F 5/0415* (2013.01); *B01F 5/0428* (2013.01); *B01F 5/0693* (2013.01); *B01F 7/00241* (2013.01); *B01F 7/00908* (2013.01); *B01F 2003/04319* (2013.01); *B01F 2003/04723* (2013.01);
(Continued)

(58) Field of Classification Search
CPC .............. B01F 3/04113; B01F 3/04531; B01F 5/0415; B01F 5/0428; B01F 5/0693; B01F 7/00241; B01F 7/00908; B01F 2003/04319; B01F 2003/04723; B01F 2003/04858; B01F 2003/04872; B01F 2005/0436
USPC ............................................ 261/76, DIG. 75
See application file for complete search history.

(56) References Cited

U.S. PATENT DOCUMENTS

| 4,541,780 A * | 9/1985 | Moreland ............ A61H 33/027 137/625.41 |
| 8,302,942 B2 * | 11/2012 | Tsai ...................... B01F 3/0446 261/118 |

(Continued)

*Primary Examiner* — Charles S Bushey
(74) *Attorney, Agent, or Firm* — Wang Law Firm, Inc.

(57) ABSTRACT

A micro-bubble generator has an intake manifold, a casing threadingly connected to the intake manifold, a first air inlet channel defined between threads of the intake manifold and the casing, a booster located inside the casing and having a gap defined between the casing and the booster to form a second air inlet channel and to communicate with the first air inlet channel, a bubble generating tube located inside the casing and having a third air inlet channel defined between the end faces of the bubble generating tube and of the booster. The booster includes a first water inlet and a first water outlet having an inner diameter smaller than that of the first water inlet so that water velocity at the first water outlet is faster than that at the first water inlet, which forces ambient air to enter the bubble generating tube via air inlet channels and to be mixed with water in the bubble generating tube to generate bubbles. Bubbles are cut into micro-bubbles after passing through the cutter and exit the bubble exit.

10 Claims, 3 Drawing Sheets

(52) U.S. Cl.
CPC .............. *B01F 2003/04858* (2013.01); *B01F 2003/04872* (2013.01); *B01F 2005/0436* (2013.01)

(56) References Cited

U.S. PATENT DOCUMENTS

| | | | | |
|---|---|---|---|---|
| 8,968,449 | B2* | 3/2015 | Boily | A47J 31/4485 |
| | | | | 96/204 |
| 10,053,351 | B2* | 8/2018 | Van Der Weij | B01F 3/04787 |
| 2015/0352503 | A1* | 12/2015 | Lai | B01F 3/04106 |
| | | | | 261/121.1 |
| 2017/0304782 | A1* | 10/2017 | Wu | B01F 3/04248 |
| 2019/0060846 | A1* | 2/2019 | Juan | B01F 5/0428 |

* cited by examiner

MICRO-BUBBLE GENERATOR

FIELD OF THE INVENTION

The preferred embodiment of the present invention is related to a micro-bubble generating device and, in particular, to a micro-bubble generator.

BACKGROUND

Following the advance of human footsteps, as the life quality of human is progressing, healthy concern becomes an imminent crucial social issue to be addressed. Because the diameter of each micro-bubble is extremely small, it is quite handy and convenient for users to use micro-bubbles in the field of vegetable cleaning, showering, wastewater treatment and even disinfection. As the application is widely spread in, such as, farming, agriculture, forest as well as in medication, it is an urgent need to have a simple and handy micro-bubble generator.

The current commercially available micro-bubble generator normally has an air intake channel to introduce air into the generator and then mix with water so as to generator bubbles. Having this air intake channel evidently leaves a hole in the outer casing, which is not streamlined with the outer appearance of the generator.

SUMMARY OF THE INVENTION

The primary objective of the preferred embodiment of the present invention is to solve the problem of having an air intake channel in the appearance of the micro-bubble generator.

In order to accomplish the above objective, the preferred embodiment of the present invention provides a micro-bubble generator having:

an intake manifold provided with a water inlet channel;

a casing threadingly connected to the intake manifold and having a receiving chamber, a gap defined at a joint where the casing and the intake manifold is threadingly connected, a first air inlet channel in communication with the receiving chamber and the casing and at least one bubble outlet defined at an end of the casing away from the intake manifold;

a booster located inside the receiving chamber and an end of which is provided with a first water inlet in communication with the water inlet channel and the other end of which is provided with a first water outlet having an inner diameter smaller than that of the first water inlet such that the water velocity flowing out of the first water outlet is larger than that of the water flowing into the first water inlet, wherein a second air inlet channel is defined between an outer periphery of the booster and an inner periphery of the casing;

a bubble generating tube received inside the receiving chamber and being in communication with the first water outlet, the bubble generating tube having a third air inlet channel defined between an end of the bubble generating tube close to the booster and an end of the booster corresponding to the end of the bubble generating tube, wherein the third air inlet channel communicates with the second air inlet channel and the first water outlet such that when water flows out of the first water outlet, ambient air is sucked in via the first air inlet channel, the second air inlet channel and the third air inlet channel and mixed with the water; and a cutter located in the casing at a position corresponding to where the bubbles exit so that the bubbles are cut into micro-bubbles.

The principle used in the micro-bubble generator of the preferred embodiment of the present invention is that: the water velocity at the first water outlet is increased via the booster and air is introduced into the bubble generating tube via the three air inlet channels to accomplish the goal of mixing the air with water to generate bubbles, which is then cut into micro-bubbles by the cutter.

The air channel constructed in accordance with the preferred embodiment of the present invention consists of the gap between the intake manifold and the casing and the gap at the joint between the casing and the booster so that ambient air is able to enter the bubble generating tube without the need of making an air inlet hole in the appearance of the casing and consequently destroys the overall casing streamline, which greatly simplifies the manufacture process and reduces cost.

In addition, the current air inlet hole is normally large, causing uncontrollable air inlet quantity and lots of the air bubbles being larger than 50 mm. In contrast, the air channel of the preferred embodiment of the present invention is consisted of the gaps between elements so that the air intake quantity is controllable via adjusting the gaps between elements, so as the dimension of the bubbles.

Another advantage of the preferred embodiment of the present invention is that a protrusion is formed at the bubble generating tube end face near the booster and a recessed portion is formed on the booster to correspond to the protrusion. Also, the third air inlet channel includes an air inlet recess defined in an end face of the booster, close to the protrusion.

Still another advantage of the preferred embodiment of the present invention is that the outer wall of the bubble generating tube and the outer wall of the booster are flush to one another. Also, the third air inlet channel includes a first gap defined between the protrusion and the recessed portion and communicates with the air inlet recess and the second air inlet channel.

A further advantage of the preferred embodiment of the present invention is that the bubble generating tube includes a second water inlet and a second water outlet. The second water inlet is located close to an end of the bubble generating tube, where the booster is located and the second water outlet is located at an end of the bubble generating tube, which is away from the booster.

The booster has a water exiting portion defined at a location close to the first water outlet. The water exiting portion extends to the second water inlet so that the first water outlet is defined inside the second water inlet. The third air inlet channel includes a second gap defined between the outer peripheries of the water exiting portion and the inner periphery of the protrusion, wherein the second gap communicates with the air inlet recess and the second water inlet.

Still another advantage of the micro-bubble generator of the preferred embodiment of the present invention is an air-water mixture portion near the second water inlet and having a funnel shape and tapered inner diameter.

A further advantage of the micro-bubble generator of the preferred embodiment of the present invention is an expansion guiding portion formed near the second water outlet and having a tapered inner diameter which is reduced toward an end away from the second water outlet. The expansion guiding portion has an installation space defined to communicate with a bubble exiting portion and close to the second water outlet, wherein the cutter is installed inside the installation space.

A further advantage of the micro-bubble generator of the preferred embodiment of the present invention is that the intake manifold close to the booster has a first recess receiving therein a first sealing ring which abuts against an outer periphery of the booster.

A further advantage of the micro-bubble generator of the preferred embodiment of the present invention is that the bubble generating tube has a second recess defined in an outer periphery thereof to receive therein a second sealing ring which abuts against an inner periphery of the casing.

Still, a further advantage of the micro-bubble generator of the preferred embodiment of the present invention is that the cutter is a cutting mesh having a plurality of cutting holes.

Still, a further advantage of the micro-bubble generator of the preferred embodiment of the present invention is that the cutter is a turbine via which large bubbles are turned into micro-bubbles.

PREFERRED EMBODIMENT OF THE PRESENT INVENTION

In combination with the accompanying drawings, detailed description of the preferred embodiment of the present invention is as follows.

Figure 1:
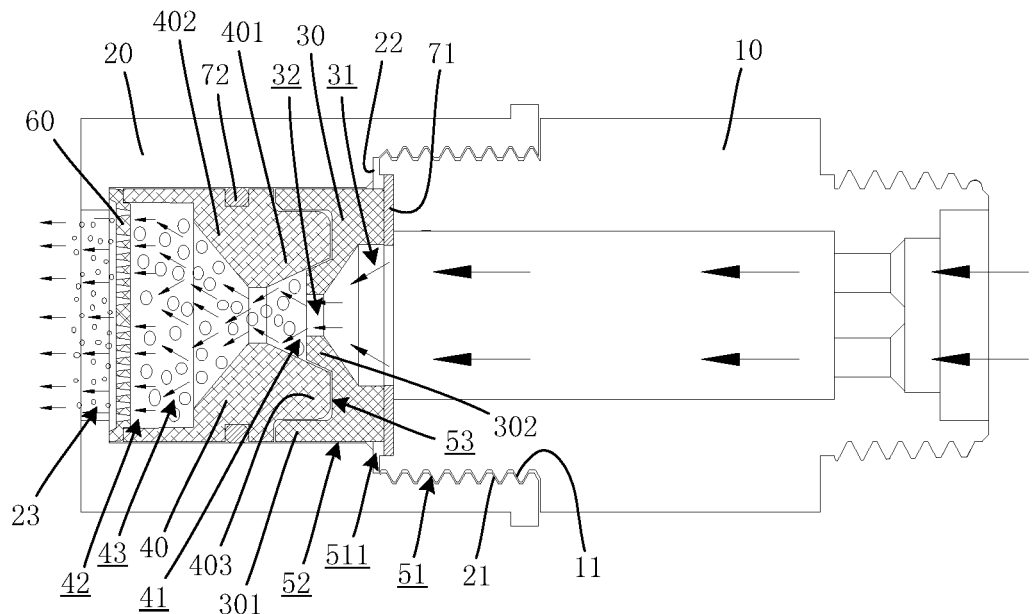
FIG. 1 is a schematic cross sectional view of the micro-bubble generator constructed in accordance with the preferred embodiment of the present invention.
Figure 2:
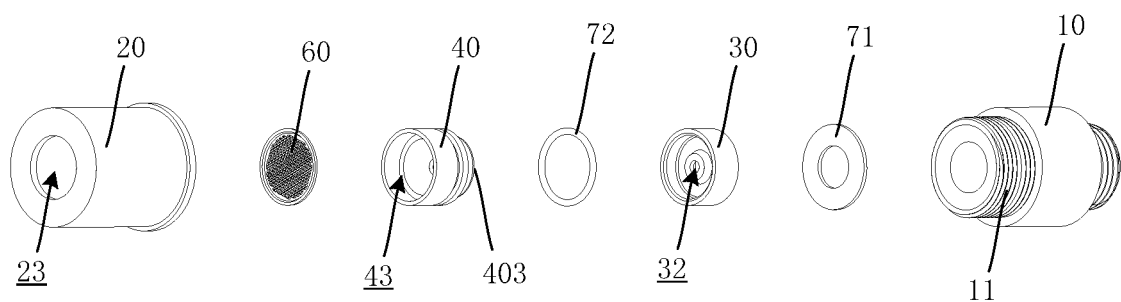
FIG. 2 is an exploded perspective view of the micro-bubble generator of the preferred embodiment of the present invention.
Figure 3:
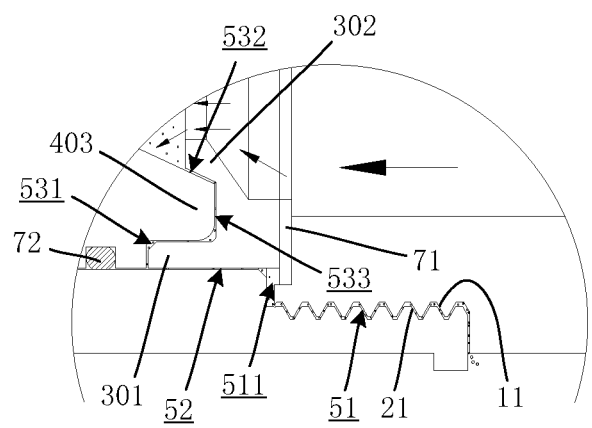
FIG. 3 is a partial enlarged schematic view of the air inlet channel in FIG. 1.

With reference to FIGS. 1 to 3, the micro-bubble generator constructed in accordance with the preferred embodiment of the present invention includes an intake manifold 10, a casing 20, a booster 30, a bubble generating tube 40, at least one air inlet channel and a cutter 60.

The intake manifold 10 has at least one outer threading 11 formed on an outer periphery thereof. The casing 20 has an inner threading 21 formed on an inner face thereof to correspond to the outer threading 11 of the intake manifold 10. When the outer threading 11 of the intake manifold 10 is threadingly connected to the outer threading 21 of the casing 20, a gap is defined between the outer threading 11 and the inner threading 21 and the gap is defined as the first air inlet channel 51. The intake manifold 10 has at least one water inlet channel and the casing 20 defines therein a receiving chamber (not numbered) and a bubble exiting hole 23 defined in an end away from a joint with the intake manifold 10.

The booster 30 is installed in the receiving chamber and has a first water inlet 31 and a first water outlet 32. The first water inlet 31 communicates with the water inlet channel of the intake manifold 10 and the first water outlet 32 has an inner diameter smaller than that of the first water inlet 31 such that when water flows from the first water inlet 31 toward the first water outlet 32. Consequently, the water velocity at the first water outlet 32 is evidently larger than the water velocity at the first water inlet 31. Preferably, the inner diameter of the booster 30 is gradually reduced from the first water inlet 31 toward the first water outlet 32. Further, a gap, i.e., a second air inlet channel 52, is defined between an outer periphery of the booster 30 and an inner periphery of the casing 20 and communicates with the first air inlet channel 51.

The bubble generating tube 40 is installed inside the receiving chamber of the casing 20 and communicates with the first water outlet 32 of the booster 30. The bubble generating tube 40 has a second water inlet 41 and a second water outlet 42. The second water inlet 41 is defined close to where the booster 30 is located and the second water outlet 42 is defined away from the booster 30. A gap, i.e., a third air inlet channel 53, is defined between an end face of the bubble generating tube 40 and an end face of the booster 30 and communicates with the second air inlet channel 51 and the second water inlet 41.

The second water inlet 41 has an inner diameter larger than that of the first water outlet 32 which is defined or located inside the second water inlet 41. As the water velocity at the first water outlet 32 is larger than the water velocity at the second water inlet 41, after water flows from the first water outlet 32 to the second water inlet 41, according to fluid dynamics, water pressure decreases, which generates a suction force. Due to the existence of this suction force, ambient air is able to be drawn into the bubble generating tube 40 via the first air inlet channel 51, the second air inlet channel 52 and the third air inlet channel 53 to be mixed with water so as to generate bubbles.

Figure 4:
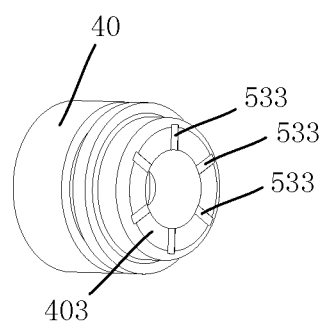
FIG. 4 is an enlarged perspective view of the bubble generating tube in FIG. 2.

Specifically, as shown in FIGS. 3 and 4, the bubble generating tube 40 has a protrusion portion 403 formed close to the booster 30 and correspondingly, the booster 30 has a recessed portion (not numbered) to accommodate the protrusion portion 403. Multiple air inlet orifices 533 are defined in the end face of the protrusion 403 and arranged radiantly around the end face of the protrusion 403. There is no gap between the end faces of the protrusion 403 of the bubble generating tube 40 and the booster 30 when the protrusion 403 is receive in the recessed portion of the booster 30. The air inlet orifices 533 are the only means used to accomplish the goal of air entrance at the joint between the booster 30 and the bubble generating tube 40.

When the booster 30 and the bubble generating tube 40 are engaged, the outer peripheries are tightly engaged. To securely engage with the bubble generating tube 40, the booster 30 has an extension 301 integrally extended out from an outer periphery thereof to surround the protrusion 403. Due to the extension 301, the recessed portion corresponding to the protrusion 403 of the bubble generating tube 40 is formed and defined. Again, due to the extension of the protrusion 403 into the recessed portion, movement in axial direction of the bubble generating tube 40 is strictly limited. Further, a first gap 531 is defined between the extension 301 and the protrusion portion 403 and communicates with the air inlet orifices 533 and the second air inlet channel.

The booster 30 has a water exiting portion 302 formed inside the recessed portion and near the first water outlet 32. The water exiting portion 302 extends into the second water inlet 41 of the bubble generating tube 40 so as to reduce the inner diameter of the first water outlet 32. It is also appreciated from the above arrangement that the first water outlet 32 is within the second water inlet 41. A second gap 532 is defined between the outer periphery of the water exiting portion 302 and the protrusion portion 403 to communicate with the air inlet orifices 533 and the second water inlet 41. As a result, a third air inlet channel 53 is formed and composed of the first gap 531, the air inlet orifices 533 and the second gap 532. From the arrangement of this third air inlet channel 53, it is appreciated that water is prevented from flowing directly into the air inlet channel.

As shown in FIG. 1 and FIG. 3, the bubble generating tube 40 is composed of an air-water mixture portion 401 close to the second water inlet 41 and an expansion guiding portion 402 close to the second water outlet 42. The air-water mixture portion 401 is of a funnel shape and has a tapered inner diameter reducing toward the second water outlet 42 such that both the inner periphery of the protrusion portion 403 and the outer periphery of the water exiting portion 302 are of a conical shape (cross section) and the inclination angle of the second gap 532 is opposite to the direction of water flow. That is, the arrangement of the air-water mixture portion 401 as well as of the protrusion portion 403 and of the water exiting portion 302 makes water flow to fluctuate and water entering the air inlet channel is avoided.

The expansion guiding portion 402 has a tapered inner diameter increasing toward the second water outlet 42. Preferably, the expansion guiding portion 402 is of a funnel shape and thus has a receiving space 43 communicating with the second water outlet 42. The cutter 60 is installed inside the receiving space 43 to cut through bubbles flowing there through to form small bubbles or micro-bubbles. Due to the funnel shape of the expansion guiding portion 402, the cutting efficiency of the cutter 60 increased and also, the quantity of micro-bubbles flowing out the second water outlet 42 is increased.

In the first embodiment of the preferred embodiment of the present invention, as shown in FIGS. 1 and 2, the cutter 60 is a mesh installed in the receiving space 43 close to the bubble exit 23 and has a diameter slightly larger than an inner diameter of the bubble exit 23 so that the cutter 60 is securely and tightly received inside the receiving space 43 and fixed by the bubble exit 23.

Figure 5:
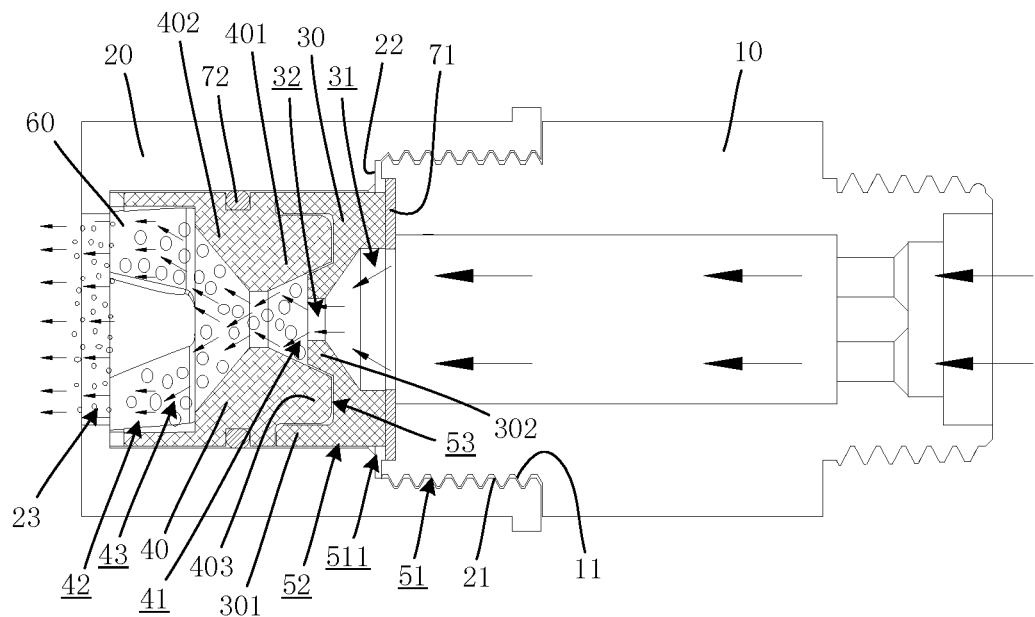
FIG. 5 is a schematic cross sectional view of the micro-bubble generator constructed in accordance with another preferred embodiment of the present invention.
Figure 6:
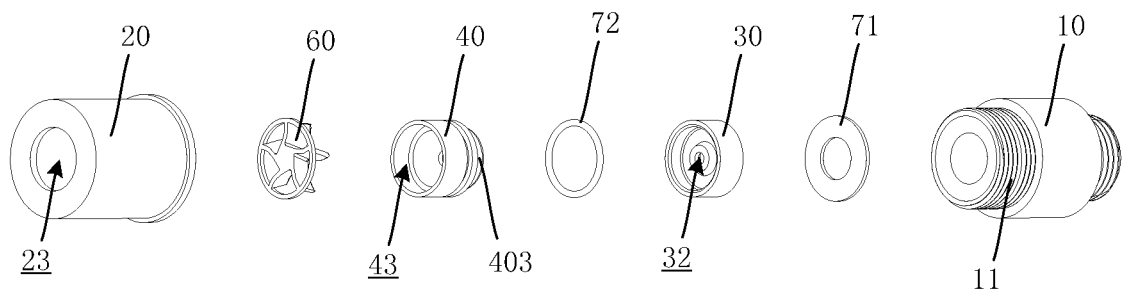
FIG. 6 is an exploded perspective view of the micro-bubble generator of the preferred embodiment of the present invention.

In the second embodiment of the preferred embodiment of the present invention, as shown in FIGS. 5 and 6, the cutter 60 is a turbine installed in the receiving space 43 close to the bubble exit 23 and has a diameter slightly larger than an inner diameter of the bubble exit 23 so that the cutter 60 is securely and tightly received inside the receiving space 43 and fixed by the bubble exit 23. When the turbine rotates, the blades cut through the bubbles passing through the receiving space 43 and disperse the cut bubbles evenly when flowing out of the bubble exit 23.

As shown in FIGS. 1 and 3, a first sealing ring 71 is provided to an end face of the intake manifold 10, which is close to the booster 30. The first sealing ring 71 is provided to abut against an end face of the booster 30 to prevent water flowing into the first air inlet channel 51 and/or the second air inlet channel 52. Preferably, the first sealing ring 71 has an inner diameter the same as that of the first water inlet 31.

Preferably, a communication gap 511 is defined at a joint between end faces of the intake manifold 10 and of the casing 20 to communicate with the first air inlet channel 51 and the second air inlet channel 52, whereas the first sealing ring 71 is located to block water from flowing into the first air inlet channel 51 and the second air inlet channel 52 via the communication gap 511.

A second sealing ring 72 is provided to an outer periphery of the bubble generating tube 40 to abut against an inner periphery of the casing 20 so as to accomplish the goal of blocking water from entering the second air inlet channel 52.

The process of generating bubbles for the micro-bubble generator of the preferred embodiment of the present invention is as follows. Water from a water source enters the intake manifold 10 and the booster 30. After passing the first water inlet 31 and forwarding to the first water outlet 32, due to the inner diameter of the first water outlet 32 being smaller than that of the first water inlet 31, water velocity increases, which causes the fact that ambient pressure is larger than that inside the micro-bubble generator of the preferred embodiment of the present invention. Consequently, ambient air is sucked in via the air inlet channels 51, 52 as well as the air inlet orifices 533 and thus mixed with the water inside the booster 30 and the bubble generating tube 40. Bubbles are spread in the expansion guiding portion 402 and cut into micro-bubbles after passing the cutter 60. Eventually, the micro-bubbles exit from the bubble exit 23.

The advantages of the micro-bubble generator of this preferred embodiment are:

The air inlet channels are defined inside the generator to streamline the overall appearance and no additional formation of air inlets, which makes production less expensive and easy. Furthermore, as the intake manifold 10 and the casing 20 are threadingly connected, air inlet quantity may be adjusted only if the diameter of the sealing rings are accordingly adjusted to ensure water in the generator does not flow into the air inlet channels.

Again, due to the axial force applied to the booster 30 when the intake manifold 10 is threadingly connected to the casing 20, the end face of the recessed portion of the booster 30 and the end face of the protrusion portion 403 of the bubble generating tube 40 are securely engaged with one another, formation of the air inlet orifices 533 in the end face of the protrusion portion 403 solves the air entering problem. Also, formations of the first gap 531 and of the second gap 532 are thus easy.

After detailed description to the preferred embodiment of the present invention in combination with the accompanying drawings, any skilled person in the art would easily grasp the essence of the present invention and provides modification, alteration or adjustment. Therefore, the detailed description above should not be regarded as a limitation of the present invention. The scope sough for protection should be defined only by the accompanying claims.

What is claimed is:

1. A micro-bubble generator comprising:
an intake manifold provided with a water inlet channel;
a casing threadingly connected to the intake manifold and having a receiving chamber, a gap defined at a joint where the casing and the intake manifold is threadingly connected, a first air inlet channel in communication with the receiving chamber and the casing and a bubble exit defined at an end of the casing and being away from the intake manifold;
a booster located inside the receiving chamber and an end of which is provided with a first water inlet in communication with the water inlet channel and the other end of which is provided with a first water outlet having an inner diameter smaller than that of the first water inlet such that water velocity flowing out of the first water outlet is larger than that of water flowing into the first water inlet, wherein a second air inlet channel in communication with the first air inlet channel is defined between an outer periphery of the booster and an inner periphery of the casing;
a bubble generating tube received inside the receiving chamber and being in communication with the first water outlet, the bubble generating tube having a third air inlet channel defined between an end of the bubble generating tube close to the booster and an end of the booster corresponding to the end of the bubble generating tube, wherein the third air inlet channel communicates with the second air inlet channel and the first water outlet such that when water flows out of the first water outlet, ambient air is sucked in via the first air inlet channel, the second air inlet channel and the third air inlet channel and mixed with the water to generate bubbles; and a cutter located in the casing at a position corresponding to where the bubble exit is located so that bubbles are cut into micro-bubbles.

2. The micro-bubble generator as claimed in claim 1, wherein the bubble generating tube has a protrusion portion and the booster has a recessed portion defined to accommodate the protrusion portion of the bubble generating tube, the third air inlet channel includes air inlet orifices defined in a protrusion portion end face close to the booster.

3. The micro-bubble generator as claimed in claim 2, wherein the third air inlet channel includes a first gap defined between a joint between the protrusion portion and the recessed portion to communicate with the second air inlet channel.

4. The micro-bubble generator as claimed in claim 3, wherein the bubble generating tube has a second water inlet and a second water outlet communicating with the second water inlet and being away from the booster; the booster has a water exiting portion formed around the first water outlet and extending into the second water inlet such that the first water outlet is located inside the second water inlet, the third air inlet channel further includes a second gap defined between an outer periphery of the water exiting portion and an inner periphery of the recessed portion and communicating with the air inlet orifices and the second water inlet.

5. The micro-bubble generator as claimed in claim 4, wherein the bubble generating tube includes an air-water mixture portion formed close to the second water inlet and being of a funnel shape, the air-water mixture portion has a tapered inner diameter.

6. The micro-bubble generator as claimed in claim 4, wherein the bubble generating tube has an expansion guiding portion formed close to the second water outlet and having a tapered inner diameter and a receiving space defined close to the second water outlet to communicate with the bubble exit, the cutter is installed inside the receiving space.

7. The micro-bubble generator as claimed in claim 1, wherein the intake manifold has a first sealing ring provided to securely abut against an end face of the booster.

8. The micro-bubble generator as claimed in claim 7, wherein the intake manifold has a second sealing ring provided to securely abut against an inner periphery of the casing.

9. The micro-bubble generator as claimed in claim 1, wherein the cutter is a mesh to cut through bubbles passing through the cutter to form micro-bubbles after passing the bubble exit.

10. The micro-bubble generator as claimed in claim 1, wherein the cutter is a turbine to cut through bubbles passing through the cutter to form micro-bubbles after passing the bubble exit.

* * * * *